May 20, 1952  G. R. GARRETT  2,597,468
SUPPLEMENTARY CONTAINER ADAPTED FOR SUPPORT
ON THE UPPER EDGES OF PRINCIPAL CONTAINERS
Filed June 28, 1949
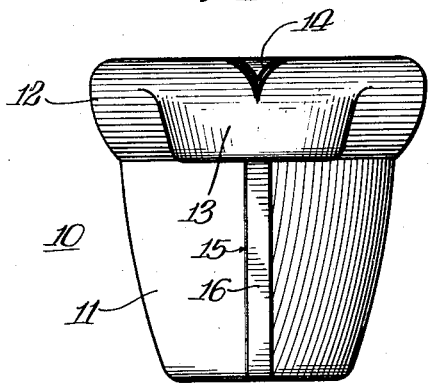
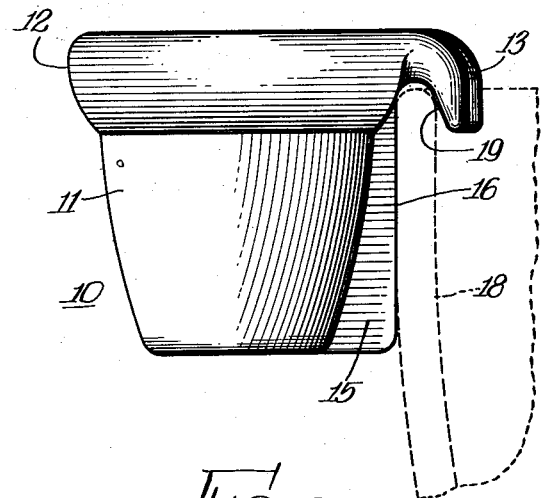
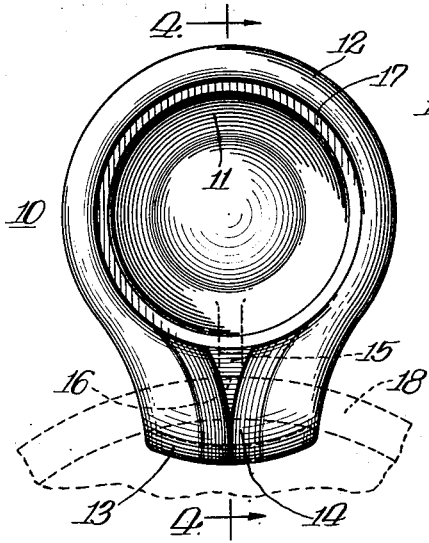
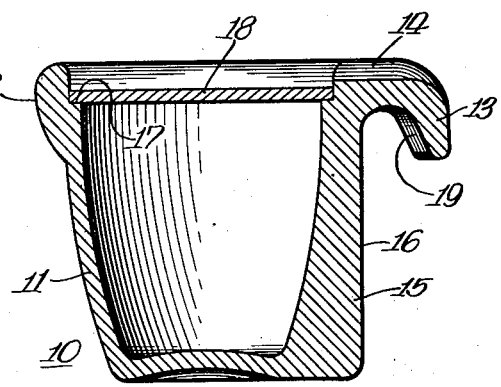
INVENTOR.
Goldie Ruth Garrett,
BY
Attys.

Patented May 20, 1952

2,597,468

UNITED STATES PATENT OFFICE 2,597,468

SUPPLEMENTARY CONTAINER ADAPTED FOR SUPPORT ON THE UPPER EDGES OF PRINCIPAL CONTAINERS

Goldie Ruth Garrett, Tulsa, Okla.

Application June 28, 1949, Serial No. 101,695

5 Claims. (Cl. 222—117)

This invention relates to supplementary containers, more particularly to supplementary containers for cream, or the like, adapted to be supported on a wall of the principal container such as a coffee cup and the invention has for an object a provision for improved supplementary containers of this character.

While it has heretofore been proposed to provide supplementary cream containers for use in restaurants and the like, which containers have been adapted to be removably supported on the upper edge of a coffee cup, such prior container structures have not been entirely satisfactory and it is a further object of this invention to provide a supplementary cream container which may be firmly supported on the upper edge of a cup or the like in readily removable relation, which may be pivoted about the upper edge of the cup to discharge its contents thereinto without removal from the cup wall and which may be readily manufactured at low cost.

A still further object of this invention is the provision of a supplementary container having a pouring groove incorporated in the hook-shaped supporting means therefor.

Another object of the invention is to provide supplementary container of the above indicated type having a closure-cap-receiving groove positioned at a level below the pouring groove whereby filled containers may be sealed during storage and handling.

Likewise it is an object of the present invention to provide a supplementary container wherein the supporting means therefor will effect a stable three-point support on principal containers or coffee cups of varying wall thickness.

For a more complete understanding of the invention, reference should now be had to the drawing in which:

Fig. 1 is a front elevational view of a supplementary container embodying the present invention;

Fig. 2 is a side elevational view of the supplementary container shown in Fig. 1, a portion of a principal container on which the supplementary container is supported being shown in broken lines;

Fig. 3 is a top plan view of the supplementary container, likewise showing a portion of the principal container in broken lines; and Fig. 4 is a vertical sectional view taken substantially along line 4—4 of Fig. 3.

Referring now to the drawing, the invention is shown as embodied in a supplementary container 10 having a cup shaped body portion 11 which is hollow as shown, the side walls of the body portion 11 terminating at the upper edges in an enlarged decorative bead 12 to facilitate gripping the container. Extending outwardly laterally from the upper edge of the body portion 11, is a hook-shaped member or means 13 which, as shown best in Fig. 3. is arcuate in form and is provided in its upper surface with a V-shaped pouring groove 14 which extends outwardly from the interior of the body portion 11. Extending outwardly from the body portion 11 and downwardly along the exterior side wall thereof, immediately below the hook means 13, is a positioning rib 15 having a substantially vertical, flat outer surface 16, the purpose of which will be more fully described hereinafter.

As shown best in Fig. 4, the body portion 11 is provided, adjacent the upper portion thereof, with the closure-cap-receiving groove or ledge 17 which is disposed at a level below the pouring groove 14 and which is adapted to receive a conventional closure cap 18 which may be formed of paper board or other suitable material.

In Figs. 2 and 3, the supplemental container 10 is shown supported on the upper edge of one wall 18 of a principal container such as a coffee cup or the like, the principal container being shown only fragmentarily in broken lines. Referring to Fig. 2, it will be observed that the under-surface 19 of the hook-shaped means 13 is curved in order to permit tilting of the supplementary container upwardly from the position shown in Fig. 2 so as to discharge the contents of the supplementary container 10 through the pouring groove 14 into the principal container without removing the supplementary container from contact with the upper edge of the wall 18. Likewise it will be observed that the under-surface 19 of the hook-shaped means 13 slopes outwardly from the positioning rib 15 so as to accommodate the supplementary container 10, to principal containers having various wall thicknesses. As shown in Fig. 3, the lateral extent of the hook-shaped means 13 is greater than that of the positioning rib 15 and is preferably reversely curved with respect to the curvature of the wall 18 so that a stable three-point support is provided by the engagement of the hook-shaped means 13 and the positioning rib 15 with the container wall 18.

The supplementary container 10, as shown, is of one piece construction and may be formed of any suitable material. In the embodiment shown, the supplementary container is illustrated as being formed of a material which may be cast or molded such as glass, porcelain, or the like, but it will, of course, be understood that supplementary containers embodying the invention may be stamped or suitably formed from sheet metals or similar materials if desired.

While a particular embodiment of the invention has been shown, it will be understood, of course, that the invention is not to be limited thereto, since many modifications may be made, and it is contemplated, therefore, by the appended claims to cover any such modifications as fall within the true spirit and scope of the invention.

I claim:

1. A supplementary container comprising a cup-shaped body portion, hook-shaped means extending outwardly from said body portion adjacent the upper edge thereof for engaging the upper edge of a principal container, and a positioning rib extending downwardly from said hook-shaped means along the exterior surface of said body portion for engaging the exterior surface of said principal container below said upper edge thereof, said hook-shaped means having a lateral dimension greater than the width of said rib to engage the inner surface of said principal container at areas laterally spaced from each other and from the area of said peripheral surface engaged by said rib.

2. A supplementary container comprising a cup-shaped body portion, hook-shaped means extending outwardly from said body portion adjacent the upper edge thereof for engaging the upper edge of a principal container, and a positioning rib extending downwardly from said hook-shaped means along the exterior surface of said body portion to substantially the bottom thereof for engaging the exterior surface of said principal container below said upper edge thereof, said hook-shaped means having a lateral curvature reverse from the curvature of said upper edge of said principal container and having a lateral dimension greater than the width of said positioning rib to engage the inner surface of said principal container at areas laterally spaced from each other and from the area of said peripheral surface engaged by said rib.

3. A supplementary container comprising a cup-shaped body portion, hook-shaped means extending outwardly from said body portion adjacent the upper edge thereof for engaging the upper edge of a principal container, and a positioning rib extending outwardly from a wall of said body portion beneath said hook-shaped means and having a substantially flat vertical surface for engaging the exterior surface of said principal container, said hook-shaped means and said rib cooperating to support said supplementary container in upright position, said hook-shaped means having a pouring groove in the upper surface thereof extending from the interior of said body portion, and said body portion having a closure-cap-receiving groove extending around the interior wall thereof at a level below said pouring groove.

4. A supplementary container comprising a cup shaped body portion, hook-shaped means extending outwardly from said body portion for engaging the upper edge of a principal container, said hook shaped means having an upper surface flush with the upper edge of said body portion and having a pouring groove extending across said upper surface from the interior of said body portion, and a positioning rib extending downwardly from said hook shaped means along the exterior surface of said body portion and having a flat vertical surface extending continuously from said hook shaped means for engaging the peripheral surface of said principal container below the upper edge thereof, said hook shaped means having a lateral dimension greater than the width of said rib to engage the inner surface of said principal container at areas laterally spaced from each other and from the area of said peripheral surface engaged by said rib.

5. A supplementary container comprising a cup shaped body portion, hook-shaped means extending outwardly from said body portion for engaging the upper edge of a principal container, said hook shaped means having an upper surface flush with the upper edge of said body portion and having a pouring groove extending across said upper surface from the interior of said body portion, and a narrow positioning rib extending downwardly from said hook shaped means along the exterior surface of said body portion and having a flat vertical surface extending continuously from said hook shaped means for engaging the peripheral surface of said principal container below the upper edge thereof, said hook shaped means being laterally curved and having a lateral dimension greater than the width of said rib to engage the inner surface of said principal container at areas laterally spaced from each other and from the area of said peripheral surface engaged by said rib.

GOLDIE RUTH GARRETT.

REFERENCES CITED

The following references are of record in the file of this patent:

UNITED STATES PATENTS

| Number | Name | Date |
| --- | --- | --- |
| 986,865 | Russell | Mar. 14, 1911 |
| 1,348,062 | Shook | July 27, 1920 |
| 1,948,932 | McMickle | Feb. 27, 1934 |
| 2,190,441 | Cecil | Feb. 13, 1940 |